United States Patent
Tsuchida et al.

(10) Patent No.: US 7,807,255 B2
(45) Date of Patent: Oct. 5, 2010

(54) HEAT-SHRINKABLE MILKY FILM, SHRINK LABEL AND CONTAINER WITH LABEL

(75) Inventors: Koji Tsuchida, Osaka (JP); Hideaki Umeda, Osaka (JP)

(73) Assignee: Fuji Seal International, Inc., Osaka-shi (JP)

( * ) Notice: Subject to any disclaimer, the term of this patent is extended or adjusted under 35 U.S.C. 154(b) by 432 days.

(21) Appl. No.: 10/553,862

(22) PCT Filed: Apr. 22, 2004

(86) PCT No.: PCT/JP2004/005775

§ 371 (c)(1),
(2), (4) Date: Oct. 21, 2005

(87) PCT Pub. No.: WO2004/094139

PCT Pub. Date: Nov. 4, 2004

(65) Prior Publication Data

US 2006/0275592 A1 Dec. 7, 2006

(30) Foreign Application Priority Data

Apr. 24, 2003 (JP) .............................. 2003-119400
Aug. 1, 2003 (JP) .............................. 2003-284765

(51) Int. Cl.
*B32B 7/02* (2006.01)
(52) U.S. Cl. ...................... 428/212; 428/323; 428/203; 428/206; 428/40.1; 428/195.1; 430/124.54
(58) Field of Classification Search ................ 428/40.1, 428/195.1, 212, 323, 203, 206; 430/124.54
See application file for complete search history.

(56) References Cited

U.S. PATENT DOCUMENTS 4,818,588 A * 4/1989 Okabe et al. ................ 428/201

(Continued)

FOREIGN PATENT DOCUMENTS

JP         61-235139 A         10/1986

(Continued)

OTHER PUBLICATIONS

Japanese Office Action for Application No. 2005-505780, dated May 12, 2009.

*Primary Examiner*—Mark Ruthkosky
*Assistant Examiner*—Tamra L Amakwe
(74) *Attorney, Agent, or Firm*—Birch, Stewart, Kolasch & Birch, LLP

(57) ABSTRACT

A heat-shrinkable opaque white film of this invention includes a core layer, and white back and front layers, the core layer having a chromatic color impervious to light at wavelengths of 380 to 500 nm or an achromatic color. The core layer may contain a black, yellow, red, or brown pigment. The heat-shrinkable opaque white film in a preferred embodiment has a transmission factor to light at wavelengths of 380 to 500 nm of 5% or less. In another preferred embodiment of the heat-shrinkable opaque white film, the core layer has an achromatic color and the film has a transmission factor to light at wavelengths of 200 to 600 nm of 3% or less. A shrink label of this invention has the heat-shrinkable opaque white film, and a preprinted ink label layer arranged on a surface of the front layer of the film. A labeled container of this invention includes a container body and the shrink label arranged on the container body. This labeled container can prevent discoloration and deterioration of contents induced by light, enables clear printing typically of a design and gives excellent visual impression of the contents.

7 Claims, 3 Drawing Sheets

U.S. PATENT DOCUMENTS

| | | | | |
|---|---|---|---|---|
| 5,186,782 | A | * | 2/1993 | Freedman .............. 156/244.11 |
| 5,190,609 | A | * | 3/1993 | Lin et al. ...................... 156/85 |
| 5,534,276 | A | * | 7/1996 | Ennis ......................... 426/127 |
| 6,294,236 | B1 | * | 9/2001 | Freedman .................. 428/40.1 |
| 6,663,947 | B2 | * | 12/2003 | Freedman et al. ........... 428/212 |
| 6,749,936 | B2 | * | 6/2004 | Argoitia et al. ............. 428/402 |
| 6,808,822 | B2 | * | 10/2004 | Rajan et al. ................. 428/516 |
| 6,844,079 | B2 | * | 1/2005 | Holzer et al. ............... 428/520 |
| 6,866,907 | B1 | * | 3/2005 | Bergholts et al. .......... 428/35.7 |
| 7,303,812 | B2 | * | 12/2007 | Hashimoto et al. ....... 428/318.6 |
| 7,306,844 | B2 | * | 12/2007 | Chu et al. ................... 428/350 |
| 2003/0134062 | A1 | * | 7/2003 | Rajan et al. ................ 428/34.9 |

FOREIGN PATENT DOCUMENTS

| | | | |
|---|---|---|---|
| JP | 9-314719 | A | 12/1997 |
| JP | 11-291431 | A | 10/1999 |
| JP | 3072897 | U | 8/2000 |
| JP | 2002-68202 | A | 3/2002 |
| JP | 2002-211630 | A | 7/2002 |
| JP | 2002-285020 | A | 10/2002 |
| JP | 2003-26252 | A | 1/2003 |
| JP | 2003-326654 | A | 11/2003 |
| WO | WO99/61245 | * | 12/1999 |

* cited by examiner

HEAT-SHRINKABLE MILKY FILM, SHRINK LABEL AND CONTAINER WITH LABEL

TECHNICAL FIELD

The present invention relates to a heat-shrinkable opaque white (translucent white) film which is impervious to light, a shrink label prepared from the heat-shrinkable opaque white film, and a labeled container including a container body and the label applied to the container body by heat shrinkage.

BACKGROUND ART

Alcoholic beverages such as beer, sake, and wine, green tea, and beverages containing vitamins are susceptible to discoloration and/or deterioration caused by light, in particular light at wavelengths of 380 to 500 nm. Widely used containers typically for beverages susceptible to light-induced deterioration are plastic bottles and glass bottles which are colored for achieving imperviousness to light. These colored containers contain colorants, and this significantly inhibits recovery and reuse of used containers.

A proposed solution to this is labeled containers including a colorless, transparent plastic bottle or glass bottle as a container body coated with a shrink label having imperviousness to light. Japanese Unexamined Patent Application Publication (JP-A) No. 2002-68202, for example, discloses a bottle having a heat-shrinkable synthetic resin film containing an ultraviolet screening agent such as zinc oxide. JP-A No. 2002-285020 discloses a container with a heat-shrinkable label prepared from a white film containing a specific amount of titanium dioxide. These containers, however, have relatively high light transmission factor particularly to visible light and do not have sufficient imperviousness to light. JP-A No. 2003-26252 discloses a container with a shrink label. The shrink label includes a heat-shrinkable film containing a white pigment and having one side to be designed and the other side printed black. This type of container, however, has a black inner side of the label, and when one look in on a beverage such as milk beverage or beer at an inlet of the container bottle, the beverage looks blackish and has poor appearance which could deteriorate one's appetite.

DISCLOSURE OF INVENTION

Accordingly, an object of the present invention is to provide a labeled container that can prevent its contents from discoloration and deterioration caused by light, can be printed clearly typically with a design, and yields an excellent appearance of the contents when viewed from outside. Another object of the present invention is to provide a heat-shrinkable opaque white film and a shrink label which are useful for preparing the labeled container.

After intensive investigations to achieve the above objects, the present inventors have found that, by covering a container body with a shrink label using a heat-shrinkable opaque white film having a specific layer configuration, the resulting container can prevent its contents such as beverages from light-induced deterioration, have, for example, a clear design, and show such an excellent appearance of the contents such as beverages that the contents look their original colors without discomfort. The present invention has been achieved based on these findings.

Specifically, the present invention provides a heat-shrinkable opaque white film comprising a core layer; and white back and front layers, the core layer having a chromatic color with low transparency to light at wavelengths of 380 to 500 nm or an achromatic color.

The core layer may contain at least one of black, yellow, red, and brown pigments. The heat-shrinkable opaque white film has, in a preferred embodiment, a transmission factor to light at wavelengths of 380 to 500 nm of 5% or less. In another preferred embodiment of the heat-shrinkable opaque white film, the core layer has an achromatic color, and the film has a transmission factor to light at wavelengths of 200 to 600 nm of 3% or less. In yet another preferred embodiment of the heat-shrinkable opaque white film, the film has a W-value 60% or more on a surface of the front layer.

The heat-shrinkable opaque white film according to the present invention can be prepared, for example, by co-extruding back and front layers with a core layer and drawing the coextrudate.

The present invention also provides a shrink label comprising the heat-shrinkable opaque white film, and a preprinted ink label layer arranged on or above a surface of the front layer of the film.

The present invention further provides a labeled container comprising a container body; and the shrink label arranged on or above the container body.

BEST MODE FOR CARRYING OUT THE INVENTION

Figure 1:
FIG. 1 is a schematic cross-sectional view showing an example of the shrink label according to the present invention.

The present invention will be illustrated in detail with reference to the attached drawings according to necessity. The heat-shrinkable opaque white film according to the present invention comprises a core layer (central layer); and white back and front layers (front layer and back layer). The core layer has a chromatic color having low transparency to light (blocking light) at wavelengths of 380 to 500 nm or an achromatic color. The "front layer" means a layer which constitutes an outside layer when applied to a container and is to be printed typically with a design upon the preparation of a label. The "back layer" means a layer lying near to a container when formed into a label. The heat-shrinkable opaque white film according to the present invention can prevent the contents such as a beverage containing vitamins or beer from discoloration and deterioration, since the core layer has an achromatic color or has imperviousness to light at wavelengths of 380 to 500 nm (the ultraviolet region to the blue-green visible light region). A design or such can be clearly printed when the film is formed into a label, since the front layer is white and the film is thereby opaque white. In addition, when the label is applied to a container to form a labeled container, the contents in the container, such as beverages, look natural without deterioration of their original colors when viewed from the spout of the container, since the back layer is white. The heat-shrinkable opaque white film may further comprise any other layer or layers within ranges not adversely affecting the properties such as heat-shrinkability, beauty and handleability, in addition to the core layer and the back and front layers. Examples of the other layers are transparent resin layers, other colored resin layers, and resin layers for improving adhesion between layers, The shrink label according to the present invention comprises the heat-shrinkable opaque white film and a preprinted ink label layer arranged on or above a surface of the front layer. FIG. 1 is a schematic cross-sectional view showing an example of the shrink label according to the present invention. The illustrated shrink label comprises a heat-shrinkable opaque white film 4 and a preprinted ink label layer 5. The heat-shrinkable opaque white film 4 comprises a white front layer 1, a core layer 2 having a chromatic color with low transparency to light at wavelengths of 380 to 500 nm or an achromatic color, and a white back layer 3. The preprinted ink label layer 5 is arranged on a surface of the front layer 1 of the film 4.

Each of the front layer 1, the core layer 2, and the back layer 3 may independently comprise a heat-shrinkable film layer. Materials for such heat-shrinkable film layers can be those generally used as materials for heat-shrinkable films, such as polyester resins, polystyrene resins, polyolefin resins, and poly(vinyl chloride) resins. Each of these materials can be used alone or in combination.

The polyester resins can be polyester resins prepared according to a conventional procedure such as condensation between a diol component and a dicarboxylic acid component (or a reactive derivative thereof, such as an ester). Examples of the diol component constituting the polyester resins are aliphatic diols such as ethylene glycol, propylene glycol, 1,3-propanediol, 2,2-dimethyl-1,3-propanediol, 2-methyl-2-ethyl-1,3-propanediol, 2,2-diethyl-1,3-propanediol, 2-ethyl-2-butyl-1,3-propanediol, 1,3-butanediol, 1,4-butanediol, 1,6-hexanediol, and 2,2,4-trimethyl-1,6-hexanediol; thiodiethanol; polyalkylene glycols such as diethylene glycol, dipropylene glycol, polyethylene glycol, and polypropylene glycol; alicyclic diols such as 1,2-cyclohexanedimethanol, 1,3-cyclohexanedimethanol, and 1,4-cyclohexanedimethanol; and aromatic diols including ethylene oxide adducts of bisphenol compounds such as 2,2-bis(4'-β-hydroxyethoxydiphenyl)propane and bis(4'-β-hydroxyethoxyphenyl)sulfone, as well as xylylene glycol. Each of these diol components can be used alone or in combination.

Examples of the dicarboxylic acid component constituting the polyester resins are aliphatic dicarboxylic acids such as oxalic acid, malonic acid, succinic acid, glutaric acid, adipic acid, pimelic acid, suberic acid, azelaic acid, and sebacic acid; alicyclic dicarboxylic acids such as 1,4-decahydronaphthalenedicarboxylic acid, 1,5-decahydronaphthalenedicarboxylic acid, 2,6-decahydronaphthalenedicarboxylic acid, 1,3-cyclohexanedicarboxylic acid, and 1,4-cyclohexanedicarboxylic acid; and aromatic dicarboxylic acids such as terephthalic acid, isophthalic acid, 4,4'-biphenyldicarboxylic acid, trans-3,3'-stilbenedicarboxylic acid, trans-4,4'-stilbenedicarboxylic acid, 4,4'-dibenzyldicarboxylic acid, and naphthalenedicarboxylic acids such as 2,6-naphthalenedicarboxylic acid. Each of these dicarboxylic acid components can be used alone or in combination.

Preferred polyester resins are those prepared by using ethylene glycol as a main diol component, and an aromatic dicarboxylic acid such as terephthalic acid, isophthalic acid, or a naphthalenedicarboxylic acid as a main dicarboxylic acid component.

The polystyrene resins can be styrene-conjugated diene block copolymers such as styrene-butadiene-styrene block copolymers and styrene-isoprene-styrene block copolymers; and mixtures of the styrene-conjugated diene block copolymers with one or more other polymers such as polystyrenes or copolymers between styrene and an acrylic monomer such as (meth)acrylic ester. The styrene-conjugated diene block copolymers may each have a styrene content of about 30 to about 95 percent by weight and a conjugated diene content of about 5 to about 70 percent by weight.

Each of the white front layer 1 and the white back layer 3 can independently comprise the resin component and a white colorant. Such white colorants are not limited and include white pigments such as titanium dioxide, antimony white, zinc sulfide, and zinc white. Among them, titanium dioxide has high whiteness to prevent the chromatic color of the core layer 2 from being seen through and is particularly preferred. The content of the white colorant in each of the front layer 1 and the back layer 3 can be set as appropriate according typically to the whiteness and cost and varies depending on the species of the white colorant. It is generally about 1 to about 20 percent by volume of the total volume of each layer. The content of titanium dioxide, for example, per layer is generally about 5 to about 40 percent by weight, and preferably about 10 to about 25 percent by weight of the total weight of each layer.

The average particle diameter of a white pigment such as titanium dioxide, if used as the white colorant, is, for example, about 0.01 to about 10 μm, preferably about 0.01 to about 5 μm, and more preferably about 0.1 to about 1 μm. If the average particle diameter is less than 0.01 μm, dispersibility may be deteriorated. If it exceeds 10 μm, the film may have a rough surface and show a deteriorated appearance.

Adding a small amount of blue colorant such as a blue pigment to the white front layer 1 makes a yellow, red or brown color of the core layer become inconspicuous when viewed from the front side. The amount of the blue colorant is, for example, about 0.01 to about 0.5 percent by weight based on the total weight of the front layer 1.

The white front layer 1 and the white back layer 3 include, in addition to a layer colored with the white colorant, a layer looking white, cloudy (milky) or opaque white as a result typically of foaming or mixing of two or more immiscible resins.

The core layer 2 includes an achromatic layer such as a black core layer and a grey core layer. The black core layer 2 can comprise the resin component and a black colorant. The black colorant is not specifically limited and can be any of known black pigments, of which carbon black is typically preferred. The content of the black colorant in the black core layer 2 can be set as appropriate in consideration typically of the imperviousness to light and cost within ranges not adversely affecting the whiteness of the back and front layers of the film. It is generally preferably $1 \times 10^{-3}$ to 6 percent by volume based on the total volume of the core layer 2.

The amount of carbon black, if used as the black colorant, is generally about 0.01 to about 5 percent by weight, and preferably about 0.05 to about 3 percent by weight based on the total weight of the core layer 2. The amount of carbon black is preferably $5 \times 10^{-4}$ percent by weight or more (e.g., about $5 \times 10^{-4}$ to about 2.5 percent by weight) based on the total weight of the heat-shrinkable opaque white film. The content of carbon black per unit area of the opaque white film is preferably about $1 \times 10^{-4}$ g/m$^2$ to about 5 g/m$^2$, and more preferably about $1 \times 10^{-3}$ g/m$^2$ to about 1 g/m$^2$.

The average particle diameter of a black pigment such as carbon black, if used as the black colorant, is for example about 0.001 to about 10 μm, and preferably about 0.01 to about 1 μm. If the average particle diameter is less than 0.001

μm, the dispersibility may often decrease. If it exceeds 10 μm, it may be difficult to achieve sufficient imperviousness to light.

The grey core layer 2 can comprise the resin component, a black colorant, and a white colorant. The black colorant and the white colorant herein can be any of those mentioned above. Among them, carbon black and titanium dioxide are preferred as the black colorant and the white colorant, respectively. The content in the core layer 2 and the average particle diameter of the black colorant are as mentioned above. The content of the white colorant can be set as appropriate in consideration typically of the whiteness and imperviousness to light of the film and cost and is generally about 1 to about 40 percent by weight, and preferably about 5 to about 25 percent by weight based on the total weight of the core layer 2.

Such an achromatic core layer can be a layer of a metallic color such as silver, prepared by adding fine metal particles such as fine aluminum particles and fine silver powder as a colorant.

Apart from the above configuration, the core layer 2 can comprise the resin component and a chromatic colorant which is capable of preventing light (is impervious to light) at wavelengths of 380 to 500 nm from passing through. The chromatic colorant can be, for example, any of yellow pigments, red pigments, and brown pigments. Examples of the yellow pigments are inorganic pigments such as yellow ocher, aureolin, cadmium yellow, cadmium orange, chromium yellow, zinc yellow, Naples yellow, and nickel yellow; and organic pigments such as azo pigments and greenish yellow. Examples of the red pigments are inorganic pigments such as cadmium red, cadmopone red, chromium red, vermilion, and iron oxide red; and organic pigments such as azo pigments, alizarin lake, quinacridone, and cochineal lake perylene. The brown pigments include inorganic pigments such as umber, raw umber, burnt umber, yellow ocher, Vandyke brown, sienna, raw sienna, burnt sienna, and iron oxide red; and organic pigments such as sepia. Each of these chromatic colorants can be used alone or in combination. The core layer having a chromatic color with low transparency to light at wavelengths of 380 to 500 nm can be a layer of a metallic color incorporated with fine metal particles as a colorant.

The content of the chromatic colorant in the core layer 2 can be set as appropriate in consideration typically of the imperviousness to light (light blocking property) and cost within ranges not adversely affecting the whiteness of the back and front layers of the film. It is generally about 0.01 to about 20 percent by weight, and preferably about 0.05 to about 15 percent by weight based on the total weight of the core layer 2. The amount of the chromatic colorant is preferably $5 \times 10^{-4}$ percent by weight or more (e.g., about $5 \times 10^{-4}$ to about 5 percent by weight) based on the total weight of the heat-shrinkable opaque white film. The content of the chromatic colorant per unit area of the opaque white film is preferably about $1 \times 10^{-4}$ g/m$^2$ to about 5 g/m$^2$, and more preferably about $1 \times 10^{-3}$ g/m$^2$ to about 1 g/m$^2$.

While varying depending on its species, the average particle diameter of the chromatic colorant generally about 0.01 to about 1 μm. If the average particle diameter exceeds 1 μm, sufficient imperviousness to light may not be satisfactorily obtained. If it is less than 0.01 μm, the dispersibility may often decrease. When the colorant is a yellow pigment, the average particle diameter is particularly preferably within the range of 0.3 to 0.6 μm. In the case of a brown pigment, the average particle diameter is particularly preferably in the range of 0.4 to 0.7 μm.

The core layer 2 may further comprise a white colorant such as a white pigment, for increasing the whiteness. When a red pigment and/or a brown pigment is used as the chromatic colorant, the chromatic color of the core layer 2 may slightly appear on the surface of the film. The chromatic color of the core layer 2 can be substantially fully masked by adding a white colorant to the core layer 2. The white colorant herein can be as mentioned above, of which titanium dioxide is preferred. The content of the white colorant, if added, is, for example, about 0.1 to about 40 percent by weight, and preferably about 5 to about 25 percent by weight based on the total weight of the core layer 2.

It is not always necessary to use a transparent material as a resin material for constituting the core layer 2. Consequently, recycled materials such as failed printed films, borders on the periphery of films, and film pieces with printed portions can be effectively used as the resin material. This is a very economical advantage. In this case, the amount of the recycled material can be set as appropriate within ranges not adversely affecting properties such as imperviousness to light and heat-shrinkability and is generally preferably 30 percent by weight or less (e.g., about 1 to about 30 percent by weight) of the total amount of resin materials constituting respective layers.

In the heat-shrinkable opaque white film 4 according to the present invention, it is not always necessary to constitute all the front layer 1, the core layer 2 and the back layer 3 as heat-shrinkable film layers, as long as the heat-shrinkable opaque white film as a whole is heat-shrinkable. Heat-shrinkability can be imparted to the opaque white film 4, for example, by constituting one or two of the three layers as heat-shrinkable film layers, or arranging a heat-shrinkable film layer in addition to the three layers. Each of the front layer 1, the core layer 2, and the back layer 3 can comprise a printed layer or a coating layer, if not a heat-shrinkable film layer. The front layer 1 and the back layer 3 can be formed, for example, by printing both sides (back and front sides) of an achromatic or chromatic heat-shrinkable film layer to be the core layer 2 with an ink containing a white pigment such as titanium dioxide according to a conventional printing procedure such as gravure printing. Likewise, the core layer 2 can be formed by printing a white heat-shrinkable film layer to be the front layer 1 with an ink containing an achromatic or chromatic colorant according to a conventional printing procedure such as gravure printing. When the film comprise two or more heat-shrinkable film layers, resins constituting these layers may be of different species but are preferably of the same species from the viewpoints typically of workability and recycling property.

Representative layer configurations of the heat-shrinkable opaque white film 4 include (1) white heat-shrinkable film layer (front layer)/black, grey or chromatic heat-shrinkable film layer (core layer)/white heat-shrinkable film layer (back layer); (2) white heat-shrinkable film layer (front layer)/black, grey or chromatic heat-shrinkable film layer (core layer)/white preprinted layer (back layer); and (3) white preprinted layer (front layer)/black, grey or chromatic heat-shrinkable film layer (core layer)/white heat-shrinkable film layer (back layer). Preferred layer configurations in the present invention are those in which at least the core layer 2 is a black, grey or chromatic heat-shrinkable film layer. In these layer configurations, cost can be reduced. This is because, for example, a sufficient density can be achieved by directly kneading an achromatic or chromatic colorant into a resin. The achromatic or chromatic core layer can be formed by using a recycled material. When it is a black core layer, a larger amount of a recycled material can be used. It is preferred to constitute all the front layer 1, the core layer 2, and the back layer 3 as heat-shrinkable film layers. This is because, for example, (i) the three layers can be formed by an easy and convenient procedure of coextrusion, heat-shrinkability can be imparted by subjecting the extruded three layers to drawing simultaneously, and the heat-shrinkable opaque white film can thereby be produced with high production efficiency; (ii) if a printing process such as gravure printing is employed, a heat-shrinkable film layer is dissolved or deteriorated with a solvent in ink, the film layer is difficult to have a sufficiently high whiteness and requires higher cost; and (iii) when a preprinted layer is highly shrunk, it may have ink cracking and have a deteriorated appearance.

Each of the front layer 1, the core layer 2, and the back layer 3 constituting the heat-shrinkable opaque white film 4 may further comprise any of additives according to necessity. Such additives include lubricants, fillers, thermostabilizers, antioxidants, ultraviolet absorbents, antistatics, and flame-retarders.

The thickness of the heat-shrinkable opaque white film 4 can be set as appropriate within ranges not adversely affecting properties such as handleability, appearance, imperviousness to light, and heat-shrinkability. It is, for example, about 10 to about 200 μm, and preferably about 30 to about 70 μm. The thickness of the core layer 2 is generally about 1% to about 80%, preferably about 5% to about 50%, and specifically preferably about 5% to about 30% of the total thickness of the heat-shrinkable opaque white film 4.

The heat-shrinkable opaque white film 4 can be prepared according to a conventional procedure for preparing multilayer films, such as coextrusion and lamination. More specifically, a heat-shrinkable opaque white film having the layer configuration (1), i.e., white heat-shrinkable film layer (front layer)/black, grey or chromatic heat-shrinkable film layer (core layer)/white heat-shrinkable film layer (back layer), can be prepared by subjecting a resin composition (A) containing a resin and a white colorant, a resin composition (B) containing a resin and at least a black colorant or a chromatic colorant, and a resin composition (C) containing a resin and a white colorant to melt-coextrusion using an extruder equipped with a T-die or annular die, cooling the extrudate typically using a chill roll, and drawing the cooled extrudate. Drawing can be carried out according to any of tenter drawing and tube drawing. Drawing can be any of biaxial drawing and uniaxial drawing (uniaxial stretching). The percent of stretch can be set as appropriate according to a desired heat-shrinkage percentage. This method comprising the steps of molding a film by coextrusion and drawing the molded film is preferred, because a multilayer film can be easily obtained and the individual layers can be drawn under the same conditions. Melt coextrusion to yield a five-layer configuration in which each of the front layer and the back layer has a two-layer configuration is also acceptable.

Another heat-shrinkable opaque white film having the layer configuration (1) can be prepared by preparing individual heat-shrinkable films for individual layers by extruding in different steps, and laminating the individual films by dry lamination. According to this method, films comprising resins that are resistant to coextrusion can be laminated, although the resulting multilayer film has adhesive layers between the individual layers and thereby has lower shrinkability than that in the film of coextruded layers.

A heat-shrinkable opaque white film having the layer configuration (2), i.e., white heat-shrinkable film layer (front layer)/black, grey or chromatic heat-shrinkable film layer (core layer)/white preprinted layer (back layer), can be produced, for example, by subjecting a resin composition (A) containing a resin and a white colorant, and a resin composition (B) containing a resin and at least a black colorant or a chromatic colorant to melt coextrusion using an extruder equipped with a T-die or annular die, cooling the extrudate typically with a chill roll, subjecting the cooled extrudate to drawing in the same manner as above, and forming one or more layers of white printing to a back side of the layer formed from the resin composition (B) (corresponding to the core layer) typically by gravure printing with a white ink. When a white preprinted layer is formed as the back layer typically by gravure printing, the sliding property of the surface of the back layer can be increased by adding, for example, a lubricant to the white ink.

The heat-shrinkage percentage of the heat-shrinkable opaque white film 4 can be set as appropriate according typically to the shape of container to be applied and is generally 15% or more at least in one direction. For example, the heat-shrinkage percentage of a uniaxially stretched film is generally about 20% to about 90%, and preferably about 30% to about 70% in a main drawing direction when the film is immersed in hot water at 90° C. for ten seconds. The heat-shrinkage percentage of a biaxially stretched film is generally about 20% to about 90%, and preferably about 30% to about 70% in one direction (e.g., widthwise direction) and is generally about 1% to about 30%, and preferably about 3% to about 15% in the other direction (e.g., lengthwise direction) when the film is immersed in hot water at 90° C. for ten seconds.

When the heat-shrinkable opaque white film 4 according to the present invention has an achromatic layer as the core layer 2, it can have a very low light transmission factor in the ultraviolet and visible-light regions. The light transmission factor, for example, at wavelengths of 200 to 400 nm is generally 3% or less, and preferably 1% or less. The light transmission factor at wavelengths of 400 to 600 nm is generally 5% or less, and 3% or less. The light transmission factor can be adjusted, for example, by adjusting the content of a black colorant or white colorant in the core layer 2 and/or the thickness of the core layer 2.

When the heat-shrinkable opaque white film 4 according to the present invention has a layer of a chromatic color with low transparency to light at wavelengths of 380 to 500 nm as the core layer 2, the film can have a very low light transmission factor in the ultraviolet and blue-green visible-light regions. The light transmission factor at wavelengths of 380 to 500 nm is, for example, 5% or less, and preferably 3% or less. This light transmission factor can be adjusted by controlling the content of a yellow, red or brown colorant in the core layer 2 and/or the thickness of the core layer 2.

The preprinted ink label layer 5 is a layer having, for example, character information such as trade name or design as a result of printing. It can be formed on a surface of the front layer 1 of the heat-shrinkable opaque white film 4 using an ink according to a conventional printing procedure such as gravure printing, flexographic printing, or screen printing. The ink is not specifically limited, can be a suitable ink selected from, for example, solvent-based inks and water-based inks. Each of these inks can be used alone or in combination. The thickness of the preprinted ink label layer can be selected within ranges of, for example, about 0.5 to about 20 μm, and preferably about 1 to about 10 μm. The preprinted ink label layer can comprise a single layer or plural layers. An overcoat layer can be arranged on the surface of the preprinted ink label layer typically for protecting the preprinted ink label layer. The surface (inside surface with respect to the container) of the back layer 3 may be subjected to printing and indication typically of characters or may have a sliding coat layer using a transparent ink.

The shrink label according to the present invention can be formed into a tubular or cylindrical shrink label, for example, by forming the preprinted ink label layer 5 on a surface of the front layer 1 of the heat-shrinkable opaque white film 4, cutting the resulting article to a long slit with a desired width, rolling the cut article into a cylinder so that the preprinted ink label layer 5 faces outward and the main drawing direction is a peripheral direction, sticking the both ends typically with an adhesive or a solvent, or by heat sealing, and cutting the article to a desired length.

The labeled container according to the present invention comprises a container body and the shrink label according to the present invention applied on or above the container body. The container body is not specifically limited, as long as it is formed from a light-transmittable material. It can be any article such as plastic bottles and glass bottles. Examples of materials for the plastic bottles are thermoplastic resins that can undergo blow molding, including polyester resins such as poly(ethylene terephthalate)s and poly(ethylene naphthalate)s; polystyrene resins such as polystyrenes; polyolefin resins such as polyethylenes and polypropylenes; poly(vinyl chloride)s; polycarbonates; and arylate resins. Each of these materials can be used alone or in combination.

The labeled container according to the present invention can be produced, for example, by supplying the tubular shrink label to an automatic labeling apparatus, cutting the label to a desired length according to necessity, allowing the label to fit over an article to be applied (container body) continuously, and subjecting the same to heat shrinkage by allowing the same to pass through a steam tunnel or hot-air tunnel at a predetermined temperature. The contents such as beverages can be charged into the container before or after the shrink wrapping.

The labeled container according to the present invention is suitable, for example, as containers for beverages that are susceptible to discoloration and deterioration caused by light, including alcoholic beverages such as beer, sake, and wine, milk, milky drinks, green tea, and beverages containing vitamins. The labeled container is specifically preferably used as containers for white or pale color (e.g., pale yellow) contents, such as milk or milky drinks, as the back layer of the label is white.

The heat-shrinkable opaque white film according to the present invention has a core layer of black, grey, or a chromatic color with low transparency to light at wavelengths of 380 to 500 nm (the ultraviolet to blue-green visible-light regions), can thereby prevent the contents such as beverages from discoloration and deterioration. It has a white front layer, on which an indication print such as of a design can be formed clearly. In addition, when a shrink label using the heat-shrinkable opaque white film is applied to a container, the film has a white back layer, thereby enables clear and sharp looking of the contents and yields excellent appearance of the contents.

EXAMPLES

The present invention will be illustrated in further detail with reference to several examples below which by no means limit the scope of the present invention.

Example 1

A polystyrene resin composition [(titanium dioxide)/(polystyrene resin) (weight ratio)=5/95] for forming back and front layers was prepared by blending a styrene-conjugated diene block copolymer [a product of Denki Kagaku Kogyo Kabushiki Kaisha under the trade name of "CLEAREN 530L"] with a polystyrene (GPPS) [a product of SUMIKA COLOR CO., LTD. under the trade name of "SPSM-7G971"] master batch containing 60 percent by weight of titanium dioxide ($TiO_2$). A polystyrene resin composition [(carbon black)/(polystyrene resin) (weight ratio)=1/99] for forming a core layer was prepared by blending a styrene-conjugated diene block copolymer [a product of Denki Kagaku Kogyo Kabushiki Kaisha under the trade name of "CLEAREN 530L"] with a polystyrene (GPPS) [a product of SUMIKA COLOR CO., LTD. under the trade name of "SPAB-851"] master batch containing 40 percent by weight of carbon black. These resin compositions were fed to an extruder equipped with a T-die and were coextruded at a temperature of 220° C., the extrudate was cooled with a chill roll and was drawn 1.2 times in a lengthwise direction and 4 times in a widthwise direction to yield a long heat-shrinkable film. This film has a three-layer configuration and has a thickness of 50 µm (ratio of thickness of layers: (front layer)/(core layer)/(back layer)=4/3/4).

Design print and transparent overcoat were applied to one side (a surface of the front layer) of the long heat-shrinkable film using a gravure printing machine to thereby yield a shrink label. The shrink label was slit in a lengthwise direction to a predetermined length to yield plural rolls. Each roll was rewound, was rolled so that the designed surface is outside and the widthwise direction of the film is a peripheral direction, the both ends of which were adhered with each other and thereby yielded a long tube. This was cut to an appropriate length and thereby yielded a tubular shrink label. The tubular shrink label was allowed to fit for the body of a PET bottle containing milk and having an inner capacity of 280 ml and was shrunk by passing through a steam tunnel. Thus, a labeled container was produced.

Example 2

A heat-shrinkable film having a three-layer configuration was prepared by the procedure of EXAMPLE 1, except that the heat-shrinkable film had a three-layer configuration having a ratio of thickness of layers: (front layer)/(core layer)/(back layer) of 3/1/3. Using this heat-shrinkable film, a shrink label and a labeled container were produced by the procedure of EXAMPLE 1.

Example 3

A heat-shrinkable film having a three-layer configuration was prepared by the procedure of EXAMPLE 2, except for using a polystyrene resin composition for forming back and front layers having a compositional ratio (by weight) of (titanium dioxide)/(polystyrene resin) (weight ratio) of 10/90. Using this heat-shrinkable film, a shrink label and a labeled container were produced by the procedure of EXAMPLE 1.

Example 4

A heat-shrinkable film having a three-layer configuration was prepared by the procedure of EXAMPLE 2, except for using a polystyrene resin composition for forming back and front layers having a compositional ratio (by weight) of (titanium dioxide)/(polystyrene resin) (weight ratio) of 20/80. Using this heat-shrinkable film, a shrink label and a labeled container were produced by the procedure of EXAMPLE 1.

Example 5

A heat-shrinkable film having a three-layer configuration was prepared by the procedure of EXAMPLE 4, except for using a polystyrene resin composition for forming a core layer having a compositional ratio (by weight) of (carbon black)/(polystyrene resin) (weight ratio) of 0.1/99.9. Using this heat-shrinkable film, a shrink label and a labeled container were produced by the procedure of EXAMPLE 1.

Example 6

A heat-shrinkable film having a three-layer configuration was prepared by the procedure of EXAMPLE 4, except for using a polystyrene resin composition for forming a core layer having a compositional ratio (by weight) of (carbon black)/(polystyrene resin) (weight ratio) of 0.2/99.8. Using this heat-shrinkable film, a shrink label and a labeled container were produced by the procedure of EXAMPLE 1.

Comparative Example 1

A heat-shrinkable film having a three-layer configuration was prepared by the procedure of EXAMPLE 2, except for using a polystyrene resin composition for forming a core layer having a compositional ratio (by weight) of (carbon black)/(polystyrene resin) (weight ratio) of 0/100. Using this heat-shrinkable film, a shrink label and a labeled container were produced by the procedure of EXAMPLE 1.

Comparative Example 2

A heat-shrinkable film having a three-layer configuration was prepared by the procedure of EXAMPLE 2, except for using a polystyrene resin composition for forming a core layer having a compositional ratio (by weight) of (carbon black)/(polystyrene resin) (weight ratio) of 5/95. Using this heat-shrinkable film, a shrink label and a labeled container were produced by the procedure of EXAMPLE 1.

Example 7

A polystyrene resin composition [(titanium dioxide)/(polystyrene resin) (weight ratio)=20/80] for forming back and front layers was prepared by blending a styrene-conjugated diene block copolymer [a product of Denki Kagaku Kogyo Kabushiki Kaisha under the trade name of "CLEAREN 530L"] with a polystyrene (GPPS) [a product of SUMIKA COLOR CO., LTD. under the trade name of "SPSM-7G971"] white master batch containing 60 percent by weight of titanium dioxide ($TiO_2$). Separately, a polystyrene resin composition [(titanium dioxide)/(carbon black)/(polystyrene resin) (weight ratio)=20/0.05/79.95] for forming a core layer was prepared by blending a styrene-conjugated diene block copolymer [a product of Denki Kagaku Kogyo Kabushiki Kaisha under the trade name of "CLEAREN 530L"] with the white master batch and a polystyrene (GPPS) [a product of SUMIKA COLOR CO., LTD. under the trade name of "SPAB-851"] master batch containing 40 percent by weight of carbon black. These resin compositions were fed to an extruder equipped with a T-die and were coextruded at a temperature of 210° C., the extrudate was cooled with a chill roll and was drawn 1.2 times in a lengthwise direction and 4 times in a widthwise direction to yield a long heat-shrinkable film. This film has a three-layer configuration and has a thickness of 50 μm (ratio of thickness of layers: (front layer)/(core layer)/(back layer)=3/1/3).

Using this heat-shrinkable film, a shrink label and a labeled container were produced by the procedure of EXAMPLE 1.

Example 8

A heat-shrinkable film having a three-layer configuration was prepared by the procedure of EXAMPLE 7, except for using a polystyrene resin composition for forming a core layer having a compositional ratio (by weight) of (titanium dioxide)/(carbon black)/(polystyrene resin) of 20/0.2/79.8. Using this heat-shrinkable film, a shrink label and a labeled container were produced by the procedure of EXAMPLE 1.

Example 9

A heat-shrinkable film having a three-layer configuration was prepared by the procedure of EXAMPLE 7, except for using a polystyrene resin composition for forming a core layer having a compositional ratio (by weight) of (titanium dioxide)/(carbon black)/(polystyrene resin) of 20/1/79. Using this heat-shrinkable film, a shrink label and a labeled container were produced by the procedure of EXAMPLE 1.

Example 10

A heat-shrinkable film having a three-layer configuration was prepared by the procedure of EXAMPLE 7, except for using a polystyrene resin composition for forming a core layer having a compositional ratio (by weight) of (titanium dioxide)/(carbon black)/(polystyrene resin) of 20/5/75. Using this heat-shrinkable film, a shrink label and a labeled container were produced by the procedure of EXAMPLE 1.

Example 11

A polystyrene resin composition [(titanium dioxide)/(polystyrene resin) (weight ratio)=24/76] for forming back and front layers was prepared by blending a styrene-conjugated diene block copolymer [a product of Denki Kagaku Kogyo Kabushiki Kaisha under the trade name of "CLEAREN 530L"] with a polystyrene (GPPS) [a product of SUMIKA COLOR CO., LTD. under the trade name of "SPSM-7G971"] white master batch containing 60 percent by weight of titanium dioxide ($TiO_2$). Separately, a polystyrene resin composition for forming a core layer [(titanium dioxide)/(carbon black)/(polystyrene resin) (weight ratio)=20/0.2/79.8] was prepared by blending a styrene-conjugated diene block copolymer [a product of Denki Kagaku Kogyo Kabushiki Kaisha under the trade name of "CLEAREN 530L"] with the white master batch and a polystyrene (GPPS) [a product of SUMIKA COLOR CO., LTD. under the trade name of "SPAB-851"] master batch containing 40 percent by weight of carbon black. These resin compositions were fed to an extruder equipped with a T-die and were coextruded at a temperature of 210° C., the extrudate was cooled with a chill roll and was drawn 1.2 times in a lengthwise direction and 4 times in a widthwise direction to yield a long heat-shrinkable film. This film has a three-layer configuration and has a thickness of 50 μm (ratio of thickness of layers: (front layer)/(core layer)/(back layer)=3/1/3).

Using this heat-shrinkable film, a shrink label and a labeled container were produced by the procedure of EXAMPLE 1.

Example 12

A heat-shrinkable film having a three-layer configuration was prepared by the procedure of EXAMPLE 11, except for using a polystyrene resin composition for forming a core layer having a compositional ratio (by weight) of (titanium dioxide)/(carbon black)/(polystyrene resin) of 20/0.15/79.85. Using this heat-shrinkable film, a shrink label and a labeled container were produced by the procedure of EXAMPLE 1.

Example 13

A heat-shrinkable film having a three-layer configuration was prepared by the procedure of EXAMPLE 11, except for using a polystyrene resin composition for forming a core layer having a compositional ratio (by weight) of (titanium dioxide)/(carbon black)/(polystyrene resin) of 20/0.1/79.9. Using this heat-shrinkable film, a shrink label and a labeled container were produced by the procedure of EXAMPLE 1.

Comparative Example 3

A heat-shrinkable film having a three-layer configuration was prepared by the procedure of EXAMPLE 11, except for using a polystyrene resin composition for forming a core layer having a compositional ratio (by weight) of (titanium dioxide)/(carbon black)/(polystyrene resin) of 0/0/100. Using this heat-shrinkable film, a shrink label and a labeled container were produced by the procedure of EXAMPLE 1.

Comparative Example 4

A heat-shrinkable film having a three-layer configuration was prepared by the procedure of EXAMPLE 11, except for using a polystyrene resin composition for forming a core layer having a compositional ratio (by weight) of (titanium dioxide)/(carbon black)/(polystyrene resin) of 20/10/70. Using this heat-shrinkable film, a shrink label and a labeled container were produced by the procedure of EXAMPLE 1.

Example 14

A poly(ethylene terephthalate) resin composition for forming back and front layers [(titanium dioxide)/(PET resin) (weight ratio)=20/80] was prepared by blending a poly(ethylene terephthalate) resin (PET resin) [a product of Eastman Chemical Company under the trade name of "Embrace"] with a PET resin [a product of SUMIKA COLOR CO., LTD. under the trade name of "EPM-7670"] white master batch containing 50 percent by weight of titanium dioxide ($TiO_2$). Separately, a poly(ethylene terephthalate) resin composition for forming a core layer [(titanium dioxide)/carbon black)/(PET resin) (weight ratio)=20/0.05/79.95] was prepared by blending a PET resin [a product of Eastman Chemical Company under the trade name of "Embrace"] with the white master batch, and a PET resin [a product of SUMIKA COLOR CO., LTD. under the trade name of "EPM-8400"] master batch containing 30 percent by weight of carbon black. These resin compositions were fed to an extruder equipped with a T-die, were coextruded at a temperature of 250° C., the extrudate was cooled with a chill roll, was drawn 4.5 times in a widthwise direction and thereby yielded a long heat-shrinkable film having a three-layer configuration and having a thickness of 50 μm (ratio of thickness of layers: (front layer)/(core layer)/(back layer)=3/1/3).

Using this heat-shrinkable film, a shrink label and a labeled container were produced by the procedure of EXAMPLE 1.

Example 15

A heat-shrinkable film having a three-layer configuration was prepared by the procedure of EXAMPLE 14, except for using a poly(ethylene terephthalate) resin composition for forming a core layer having a compositional ratio (by weight) of (titanium dioxide)/carbon black)/(PET resin) of 20/0.2/79.8. Using this heat-shrinkable film, a shrink label and a labeled container were produced by the procedure of EXAMPLE 1.

Example 16

A heat-shrinkable film having a three-layer configuration was prepared by the procedure of EXAMPLE 14, except for using a poly(ethylene terephthalate) resin composition for forming a core layer having a compositional ratio (by weight) of (titanium dioxide)/carbon black)/(PET resin) of 20/1/79. Using this heat-shrinkable film, a shrink label and a labeled container were produced by the procedure of EXAMPLE 1.

Example 17

A heat-shrinkable film having a three-layer configuration was prepared by the procedure of EXAMPLE 14, except for using a poly(ethylene terephthalate) resin composition for forming a core layer having a compositional ratio (by weight) of (titanium dioxide)/carbon black)/(PET resin) of 20/5/75. Using this heat-shrinkable film, a shrink label and a labeled container were produced by the procedure of EXAMPLE 1.

Comparative Example 5

A heat-shrinkable film having a three-layer configuration was prepared by the procedure of EXAMPLE 14, except for using a poly(ethylene terephthalate) resin composition for forming a core layer having a compositional ratio (by weight) of (titanium dioxide)/carbon black)/(PET resin) of 0/0/100. Using this heat-shrinkable film, a shrink label and a labeled container were produced by the procedure of EXAMPLE 1.

Comparative Example 6

A heat-shrinkable film having a two-layer configuration was prepared by the procedure of EXAMPLE 14, except for using a poly(ethylene terephthalate) resin composition for forming a core layer having a compositional ratio (by weight) of (titanium dioxide)/carbon black)/(PET resin) of 0/5/95 and for not forming a back layer. Using this heat-shrinkable film, a shrink label and a labeled container were produced by the procedure of EXAMPLE 1.

Example 18

A polystyrene resin composition for forming back and front layers [(titanium dioxide)/(polystyrene resin) (weight ratio)=10/90] was prepared by blending a styrene-conjugated diene block copolymer [a product of Denki Kagaku Kogyo Kabushiki Kaisha under the trade name of "CLEAREN 530L"] with a polystyrene (GPPS) [a product of SUMIKA COLOR CO., LTD. under the trade name of "SPSM-7G971"] master batch containing 60 percent by weight of titanium dioxide ($TiO_2$). Separately, a polystyrene resin composition for forming a core layer [(red pigment)/(polystyrene resin) (weight ratio)=0.5/99.5] was prepared by adding to a styrene-conjugated diene block copolymer [a product of Denki Kagaku Kogyo Kabushiki Kaisha under the trade name of "CLEAREN 530L"] 0.5 percent by weight of liquid paraffin as a spreader, and then adding a red pigment [a product of SUMIKA COLOR CO., LTD. under the trade name of "SHPA-102", an organic pigment (azo pigment)] thereto. These resin compositions were fed to an extruder equipped with a T-die and were coextruded at a temperature of 220° C., the extrudate was cooled with a chill roll and was drawn 1.2 times in a lengthwise direction and 4 times in a widthwise direction to yield a long heat-shrinkable film. This film has a three-layer configuration and has a thickness of 50 μm (ratio of thickness of layers: (front layer)/(core layer)/(back layer)=2/1/2).

Using this heat-shrinkable film, a shrink label and a labeled container were produced by the procedure of EXAMPLE 1.

Example 19

A heat-shrinkable film having a three-layer configuration was prepared by the procedure of EXAMPLE 18, except for using a yellow pigment [a product of SUMIKA COLOR CO., LTD. under the trade name of "SHPA-347", an inorganic pigment (chromium yellow)] instead of the red pigment [a product of SUMIKA COLOR CO., LTD. under the trade name of "SHPA-102", an organic pigment] to thereby prepare a polystyrene resin composition for forming a core layer [(yellow pigment)/(polystyrene resin) (weight ratio)=1.0/99.0]. Using this heat-shrinkable film, a shrink label and a labeled container were produced by the procedure of EXAMPLE 1.

Example 20

A heat-shrinkable film having a three-layer configuration was prepared by the procedure of EXAMPLE 18, except for using a brown pigment [a product of SUMIKA COLOR CO., LTD. under the trade name of "SHPA-918", an inorganic pigment (iron oxide red)] instead of the red pigment [a product of SUMIKA COLOR CO., LTD. under the trade name of "SHPA-102", an organic pigment] to thereby prepare a polystyrene resin composition for forming a core layer [(brown pigment)/(polystyrene resin) (weight ratio)=1.0/99.0]. Using this heat-shrinkable film, a shrink label and a labeled container were produced by the procedure of EXAMPLE 1.

Example 21

A heat-shrinkable film having a three-layer configuration was prepared by the procedure of EXAMPLE 18, except for using a white pigment [titanium dioxide ($TiO_2$)] in addition to the red pigment [a product of SUMIKA COLOR CO., LTD. under the trade name of "SHPA-102", an organic pigment] to thereby prepare a polystyrene resin composition for forming a core layer [(red pigment)/(white pigment)/(polystyrene resin) (weight ratio)=0.5/5.0/94.5]. Using this heat-shrinkable film, a shrink label and a labeled container were produced by the procedure of EXAMPLE 1.

Example 22

A heat-shrinkable film having a three-layer configuration was prepared by the procedure of EXAMPLE 18, except for using a brown pigment [a product of SUMIKA COLOR CO., LTD. under the trade name of "SHPA-918", an inorganic pigment (iron oxide red)] and a white pigment [titanium dioxide ($TiO_2$)] instead of the red pigment [a product of SUMIKA COLOR CO., LTD. under the trade name of "SHPA-102", an organic pigment] to thereby yield a polystyrene resin composition for forming a core layer [(brown pigment)/(white pigment)/(polystyrene resin) (weight ratio)=1.0/5.0/94.0]. Using this heat-shrinkable film, a shrink label and a labeled container were produced by the procedure of EXAMPLE 1.

Comparative Example 7

A heat-shrinkable film having a three-layer configuration was prepared by the procedure of EXAMPLE 18, except for preparing a polystyrene resin composition for forming a core layer [(red pigment)/(polystyrene resin) (weight ratio)=0/100] without using the red pigment [a product of SUMIKA COLOR CO., LTD. under the trade name of "SHPA-102", an organic pigment]. Using this heat-shrinkable film, a shrink label and a labeled container were produced by the procedure of EXAMPLE 1.

Evaluation Test

The heat-shrinkable films prepared according to the examples and comparative examples were subjected to the following evaluation test. The results are shown in Table 1. In Table 1, "PS", "CB", "$TiO_2$", and "PET" represent a polystyrene resin, carbon black, titanium dioxide, and a poly(ethylene terephthalate) resin, respectively. The "front", "core", and "back" in the film composition represent resin compositions constituting the front layer, core layer, and back layer, respectively. The numerical values in Table 1 are percentages.

(Imperviousness to Light)

The light transmission factor at wavelengths of 200 to 1000 nm of each of the heat-shrinkable films prepared according to the examples and comparative examples was determined using a near-infrared-ultraviolet-visible spectrophotometer [a product of Shimadzu Corporation under the trade name of "UV-3101PC"], and the imperviousness to light at specific wavelength was evaluated according to the following criteria.

Figure 2:
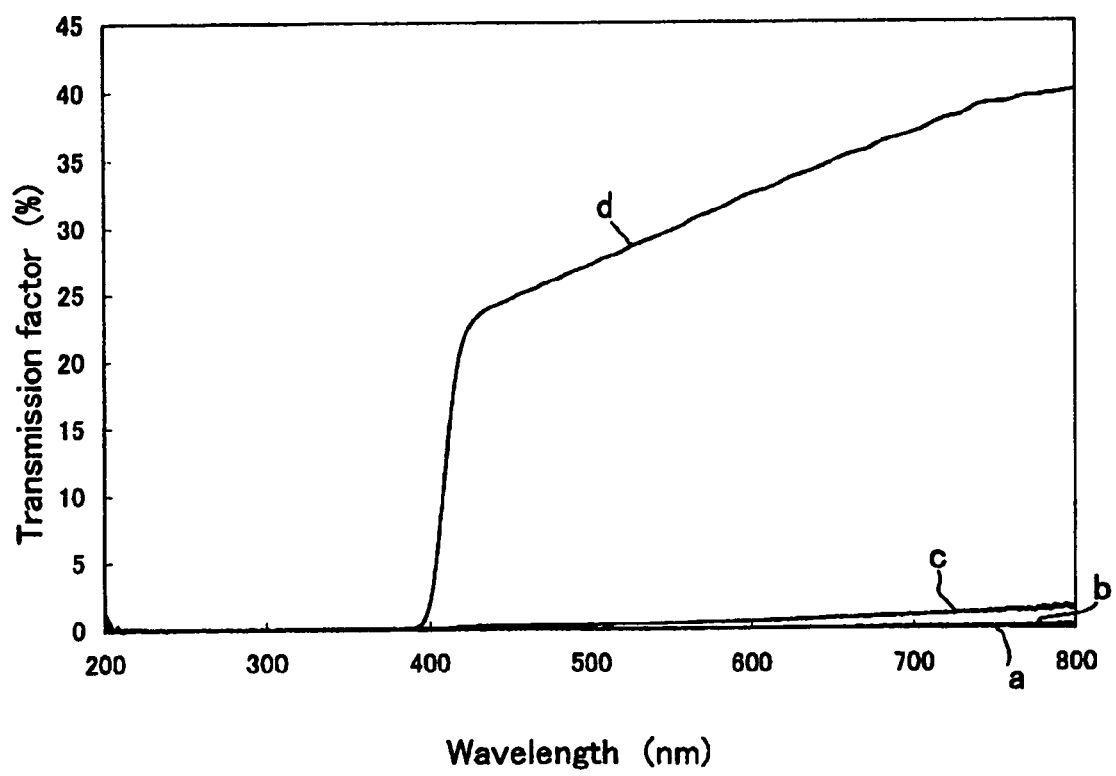
FIG. 2 is a graph showing light transmission factors (transmittances) of heat-shrinkable films obtained according to EXAMPLES 2, 3, and 4 and COMPARATIVE EXAMPLE 1.

FIG. 2 shows the measurements of the light transmission factor of the heat-shrinkable films prepared according to EXAMPLES 2, 3, and 4, and COMPARATIVE EXAMPLE 1, respectively. The symbols a, b, c, and d in FIG. 2 represent the measurements of the heat-shrinkable films according to EXAMPLE 4, EXAMPLE 3, EXAMPLE 2, and COMPARATIVE EXAMPLE 1, respectively.

Figure 3:
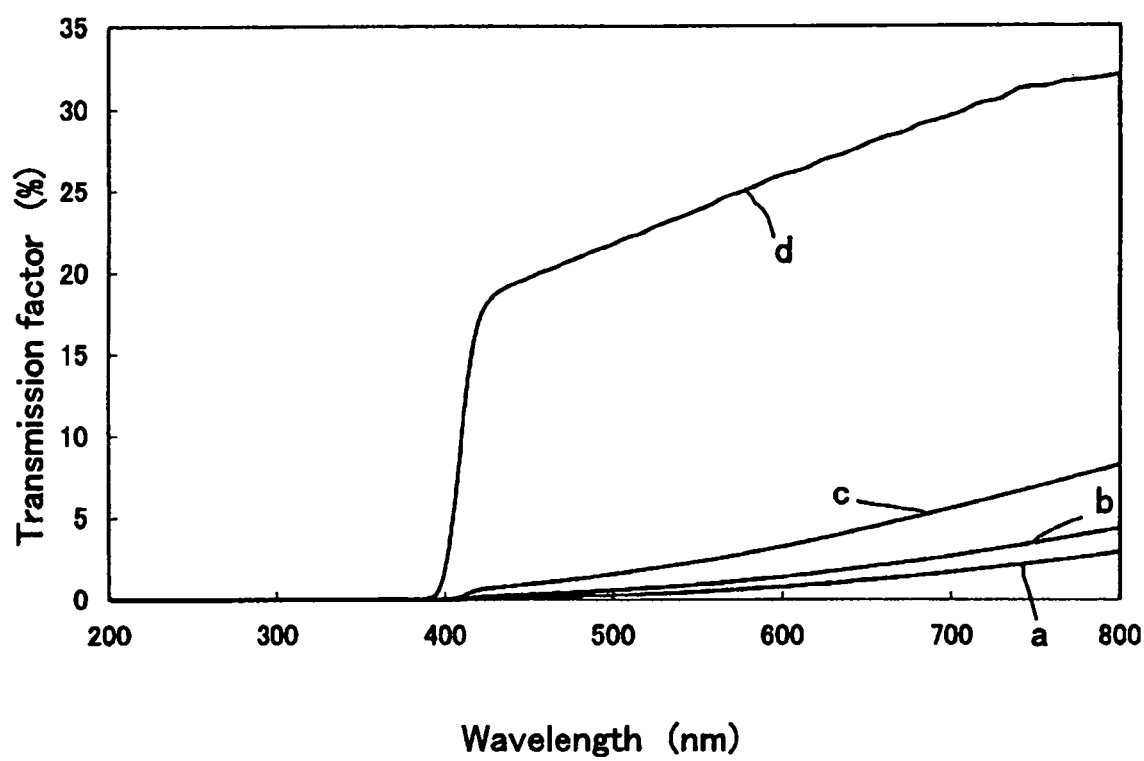
FIG. 3 is a graph showing light transmission factors (transmittances) of heat-shrinkable films obtained according to COMPARATIVE EXAMPLE 3, and EXAMPLES 11 to 13.

FIG. 3 shows measurements a, b, c, and d of the light transmission factor (transmittance) of the heat-shrinkable films prepared according to EXAMPLES 11, 12, and 13, and COMPARATIVE EXAMPLE 3, respectively.

Figure 4:
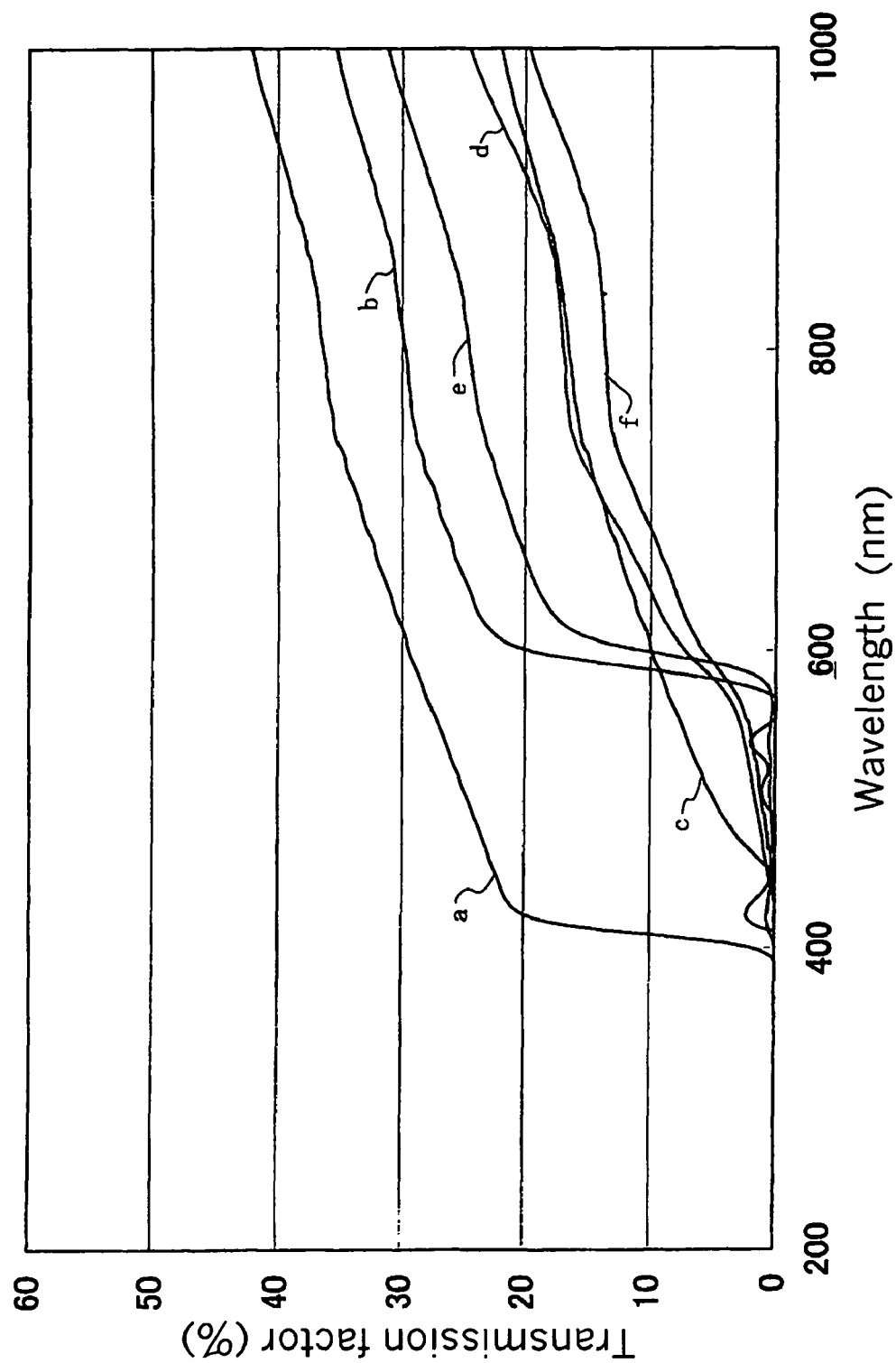
FIG. 4 is a graph showing light transmission factors (transmittances) of heat-shrinkable films obtained according to COMPARATIVE EXAMPLE 7, and EXAMPLES 18 to 22.

FIG. 4 shows measurements a, b, c, d, e, and f of the light transmission factor (transmittance) of the heat-shrinkable films prepared according to COMPARATIVE EXAMPLE 7, and EXAMPLES 18, 19, 20, 21 and 22, respectively. [Criteria for EXAMPLES 1 to 17 and COMPARATIVE EXAMPLES 1 to 6 (Tables 1 to 3)]

AA: The light transmission factor at wavelengths of 200 to 600 nm is 3% or less.

A: The light transmission factor at wavelengths of 200 to 600 nm is more than 3% and 5% or less.

C: The light transmission factor at wavelengths of 200 to 600 nm is more than 5%.

[Criteria for EXAMPLES 18 to 22 and COMPARATIVE EXAMPLE 7 (Table 4)]

A: The light transmission factor at wavelengths of 380 to 500 nm is 5% or less.

C: The light transmission factor at wavelengths of 380 to 500 nm is more than 5%.

(Whiteness)

A W-value of each of the heat-shrinkable films prepared according to the examples and comparative examples was determined on a surface of the front layer using an ultraviolet-visible spectrophotometer [a product of Shimadzu Corporation under the trade name of "UV-2450"] according to Japanese Industrial Standards (JIS) Z 8715. The whiteness of the films was evaluated according to the following criteria, while defining the measured W-value of the standard white board (a product of Japan Color Research Institute) being 100.

AA: W-value of 80 or more

A: W-value of 75 or more and less than 80

B: W-value of 60 or more and less than 75

C: W-value of less than 60

These were visually evaluated and were found that those having a W-value of 75 or more (AA and A) each have a white surface with a sharp design, in which black, grey or a chromatic color of the core layer is substantially trivial; those having a W-value of 60 or more and less than 75 (B) each have a surface of slightly grayish white or a slightly chromatic color but with a sharp design; and those having a W-value less than 60 (C) show a blackish grey surface with a darkened design or a surface with a clear chromatic color.

(Appearance of contents)

The contents (milk) was viewed through a spout of the labeled containers produced according to the examples and comparative examples, and the appearance of the contents was visually evaluated according to the following criteria.

A: The milk looks white and fresh.

C: The milk looks blackish or chromatic.

TABLE 1

|  |  | Example | | | | | | Comparative Example | |
| --- | --- | --- | --- | --- | --- | --- | --- | --- | --- |
|  |  | 1 | 2 | 3 | 4 | 5 | 6 | 1 | 2 |
| Front layer (%) | PS | 95 | 95 | 90 | 80 | 80 | 80 | 95 | 95 |
|  | $TiO_2$ | 5 | 5 | 10 | 20 | 20 | 20 | 5 | 5 |
| Core layer (%) | PS | 99 | 99 | 99 | 99 | 99.9 | 99.8 | 100 | 95 |
|  | CB | 1 | 1 | 1 | 1 | 0.1 | 0.2 | 0 | 5 |
| Film configuration (ratio of layers) |  | front/core/back (4/3/4) | front/core/back (3/1/3) | | | | | front/core/back (3/1/3) | |
| Imperviousness to light (numeral in FIG. 2) |  | AA | AA (c) | AA (b) | AA (a) | A | AA | C (d) | AA |
| Whiteness |  | B | B | A | A | AA | AA | AA | C |
| Heat shrinkage (%) |  | 53 | 53 | 52 | 52 | 54 | 54 | 55 | 51 |
| Appearance of contents |  | A | A | A | A | A | A | A | C |

TABLE 2

|  |  | Example | | | | | | | Comparative Example | |
| --- | --- | --- | --- | --- | --- | --- | --- | --- | --- | --- |
|  |  | 7 | 8 | 9 | 10 | 11 | 12 | 13 | 3 | 4 |
| Front layer (%) | PS | 80 | 80 | 80 | 80 | 76 | 76 | 76 | 76 | 76 |
|  | $TiO_2$ | 20 | 20 | 20 | 20 | 24 | 24 | 24 | 24 | 24 |
| Core layer (%) | PS | 79.95 | 79.8 | 79 | 75 | 79.8 | 79.85 | 79.9 | 100 | 70 |
|  | CB | 0.05 | 0.2 | 1 | 5 | 0.2 | 0.15 | 0.1 | 0 | 10 |
|  | $TiO_2$ | 20 | 20 | 20 | 20 | 20 | 20 | 20 | 0 | 20 |
| Film configuration (ratio of layers) |  | front/core/back (3/1/3) | | | | | | | front/core/back (3/1/3) | |
| Imperviousness to light (numeral in FIG. 3) |  | A | AA | AA | AA | AA (a) | AA (b) | A (c) | C (d) | AA |
| Whiteness |  | A | A | A | B | AA | AA | AA | AA | C |
| Heat shrinkage (%) |  | 53 | 53 | 51 | 48 | 54 | 54 | 53 | 54 | 54 |
| Appearance of contents |  | A | A | A | A | A | A | A | A | C |

TABLE 3

|  |  | Example | | | | Comparative Example | |
| --- | --- | --- | --- | --- | --- | --- | --- |
|  |  | 14 | 15 | 16 | 17 | 5 | 6 |
| Front layer (%) | PET | 80 | 80 | 80 | 80 | 80 | 80 |
|  | $TiO_2$ | 20 | 20 | 20 | 20 | 20 | 20 |
| Core layer (%) | PET | 79.95 | 79.8 | 79 | 75 | 100 | 95 |
|  | CB | 0.05 | 0.2 | 1 | 5 | 0 | 5 |
|  | $TiO_2$ | 20 | 20 | 20 | 20 | 0 | 0 |
| Film configuration (ratio of layers) |  | front/core/back (3/1/3) | | front/core/back (3/1/3) | | front/core (3/1) | |
| Imperviousness to light |  | A | AA | AA | AA | C | AA |
| Whiteness |  | A | A | A | B | AA | C |
| Heat shrinkage (%) |  | 71 | 69 | 68 | 67 | 71 | 69 |
| Appearance of contents |  | A | A | A | A | A | C |

TABLE 4

|  |  |  | Example | | | | | Com. Ex. |
| --- | --- | --- | --- | --- | --- | --- | --- | --- |
|  |  |  | 18 | 19 | 20 | 21 | 22 | 7 |
| Front layer (%) | PS |  | 90 | 90 | 90 | 90 | 90 | 90 |
|  | $TiO_2$ |  | 10 | 10 | 10 | 10 | 10 | 10 |
| Core layer (%) | Pigment | PS | 99.5 | 99.0 | 99.0 | 94.5 | 94.0 | 100 |
|  |  | Red | 0.5 | — | — | 0.5 | — | — |
|  |  | Yellow | — | 1.0 | — | — | — | — |
|  |  | Brown | — | — | 1.0 | — | 1.0 | — |
|  |  | White | — | — | — | 5.0 | 5.0 | — |
| Film configuration (ratio of layers) |  |  | front/core/back (2/1/2) | | | | | front/core/back (2/1/2) |
| Imperviousness to light (numeral in FIG. 4) |  |  | A (b) | A (c) | A (d) | A (e) | A (f) | C (a) |
| Whiteness |  |  | A | AA | A | AA | AA | AA |
| Appearance of contents |  |  | A | A | A | A | A | A |

INDUSTRIAL APPLICABILITY

As is described above, the heat-shrinkable opaque white film according to the present invention prevents discoloration and deterioration of contents such as beverages and enables clear printing typically of a design on a front layer. In addition, the shrink label using the heat-shrinkable opaque white film according to the present invention is very useful as a label that gives an excellent impression of the contents such as beverages when applied to a container and achieves good looking of the contents with original color without discomfort.

The invention claimed is:

1. A heat-shrinkable opaque white film comprising a core layer; and white back and front layers, wherein the core layer comprises carbon black as a black colorant and the amount of carbon black is 0.01 to 3 percent by weight based on the total weight of the core layer, wherein each of the white front layer and the white back layer independently comprises titanium dioxide as a white colorant, and the content of titanium dioxide is 10 to 40 percent by weight of the total weight of each layer, wherein each of the front layer, the core layer, and the back layer independently is a heat-shrinkable film layer;

wherein the thickness of the core layer is 5% to 30% of the total thickness of the heat-shrinkable opaque film;

wherein the film has a transmission factor to light at wavelengths of 380 to 500 nm of 5% or less;

wherein the heat-shrinkage percentage of the film is about 20% to about 90% when the film is immersed in hot water at 90° C. for ten seconds; and wherein the W-value of the surface of the heat-shrinkable films is 75 or more.

2. A heat-shrinkable opaque white film comprising a core layer and white back and front layers, wherein the core layer comprises at least one chromatic colorant selected from yellow pigments, red pigments, and brown pigments and has a chromatic color with low transparency to light at wavelengths of 380 to 500 nm, and the content of the chromatic colorant is 0.01 to 1 percent by weight based on the total weight of the core layer;

wherein each of the white front layer and the white back layer independently comprises titanium dioxide as a white colorant, and the content of titanium dioxide is 5 to 40 percent by weight of the total weight of each layer, wherein each of the front layer, the core layer, and the back layer independently is a heat-shrinkable film layer;

wherein the thickness of the core layer is 5% to 30% of the total thickness of the heat-shrinkable opaque film;

wherein the film has a transmission factor to light at wavelengths of 380 to 500 nm of 5% or less;

wherein the heat-shrinkage percentage of the film is about 20% to about 90% when the film is immersed in hot water at 90° C. for ten seconds; and wherein the W-value of the surface of the heat-shrinkable films is 75 or more.

3. A shrink label comprising the heat-shrinkable opaque white film of claim 1 or 2; and a preprinted ink label layer arranged on or above a surface of the front layer of the film.

4. A labeled container comprising a container body; and the shrink label of claim 3 arranged on or above the container body.

5. The heat-shrinkable opaque white film according to claim 1, wherein the core layer further comprises a white colorant, and the content of the white colorant is 1 to 40 percent by weight based on the total weight of the core layer.

6. The heat-shrinkable opaque white film according to claim 2, wherein the core layer further comprises a white colorant, and the content of the white colorant is 0.1 to 40 percent by weight based on the total weight of the core layer.

7. The labeled container according to claim 4, wherein the shrink label is arranged on or above the container body without adhesive.

* * * * *